United States Patent [19]
Spyropoulos et al.

[11] Patent Number: 5,990,181
[45] Date of Patent: Nov. 23, 1999

[54] AQUEOUS FOAM QUENCHING COMPOSITIONS

[75] Inventors: Konstantinos Spyropoulos, Mies; Daniel Yves Sane, Geneva, both of Switzerland

[73] Assignee: Witco Corporation, Greenwich, Conn.

[21] Appl. No.: 08/988,800

[22] Filed: Dec. 11, 1997

[51] Int. Cl.⁶ ............................ B01D 19/04; C09B 67/10
[52] U.S. Cl. ................. 516/118; 8/581; 510/466
[58] Field of Search .................. 516/118, 134, 516/129; 8/581; 510/466

[56] References Cited

U.S. PATENT DOCUMENTS

| | | | |
|---|---|---|---|
| 3,235,509 | 2/1966 | Nitzsche et al. | 516/117 |
| 3,560,401 | 2/1971 | O'Hara et al. | 516/117 |
| 3,691,091 | 9/1972 | Koerner | 516/117 |
| 3,822,113 | 7/1974 | Keenan et al. | 8/581 |
| 3,984,200 | 10/1976 | Doesburg | 516/124 |
| 4,021,365 | 5/1977 | Sinka et al. | 516/116 |
| 4,039,469 | 8/1977 | Raleigh | 516/117 |
| 4,076,648 | 2/1978 | Rosen | 516/118 |
| 4,395,352 | 7/1983 | Kulkarni et al. | 516/118 |
| 4,405,490 | 9/1983 | Maas et al. | 106/287.14 |
| 5,100,923 | 3/1992 | Hintz et al. | 516/116 |
| 5,380,464 | 1/1995 | McGee et al. | 516/118 |
| 5,431,853 | 7/1995 | Tsuda et al. | 516/118 |
| 5,543,082 | 8/1996 | McGee et al. | 516/118 |
| 5,645,649 | 7/1997 | Cole, Jr. | 134/18 |

FOREIGN PATENT DOCUMENTS

| | | |
|---|---|---|
| 0425992 | 5/1991 | European Pat. Off. |
| 0516109 | 5/1992 | European Pat. Off. |
| 0 687 725 A1 | 12/1995 | European Pat. Off. |
| 0 769 548 A1 | 4/1997 | European Pat. Off. |
| 26 26 994 A1 | 12/1976 | Germany. |
| 30 13 923 A1 | 10/1981 | Germany. |
| 42 37 754 C1 | 1/1994 | Germany. |
| 43 43 185 C1 | 11/1994 | Germany. |
| 5-261206 | 10/1993 | Japan. |
| 1197254 | 7/1970 | United Kingdom. |
| WO 95/05580 | 2/1995 | WIPO. |

OTHER PUBLICATIONS

Hawley's Condensed Chemical Dictionary, Eleventh Edition, (Van Nostrand Reinhold Co., NY, NY, copyright 1987) pp. 300 and 1141, Oct. 1989.

McCutcheon's Vol. 1: Emulsifiers & Detergents 1993 North American Edition, (McCutcheon Division, MC Publishing Co, Glen Rock, NJ, 1993) p. 191, Jan. 1994.

S. Ross, "Mechanisms of Foam Stabilization and Antifoaming Action", *Chemical Engineering Progress,* 63:9, pp. 41–47 (Sep. 1967).

R.S. Bhute, "Silicone Antifoaming Agents", *J. Scient. Ind. Res.,* 30:241–249 (May 1971).

Kelvin Roberts, et al., "The Effect of Spontaneous Emulsification of Defoamer on Foam Prevention", *Journal of Colloid and Interface Science,* 62:2, pp. 264–271 (Nov. 1977).

*Primary Examiner*—Richard D. Lovering
*Assistant Examiner*—Daniel S. Metzmaier
*Attorney, Agent, or Firm*—Edward K. Welch, II; Andrew S. Reiskind; Timothy X. Witkowski

[57] ABSTRACT

Disclosed are antifoam emulsions useful in control of foam in aqueous foaming systems which comprise:

(A) polydiorganosiloxane;

(B) fine solid particles of inorganic oxide, bearing on the surface thereof a polydiorganosiloxane component; wherein the total amount of polydiorganosiloxane present in components (A) and (B) comprises 5 wt % to 60 wt % of the emulsion and the weight ratio of the total amount of polydiorganosiloxane present in components (A) and (B) to the amount of said inorganic oxide is 10:1 to 200:1;

(C) an organic surfactant dispersing agent selected from the group consisting of non-ionic tetrafunctional block copolymers terminating in primary or secondary hydroxyl groups and mixtures thereof, which agent comprises 0.1 wt % to 36 wt % of said emulsion;

(D) a block copolymer of polydimethylsiloxane with one or more blocks of polyalkylene oxide, the molecular weight of the polydimethylsiloxane portion being 300 to 100,000 Daltons and the total molecular weight of all polyalkylene oxide blocks present being 100 to 40,000 Daltons, which copolymer comprises 0.1 wt. % to 20 wt. % of said emulsion;

(E) a non-ionic surfactant component comprising one or more non-ionic surfactants not conforming to agent (C) nor to copolymer (D) and comprising 1 wt % to 60 wt % of said emulsion;

(F) a thickener component which comprises 0.01 wt % to 15 wt % of said emulsion;

(G) a protective colloid component which comprises 0.01 wt. % to 10 wt. % of said emulsion; and (H) water comprising up to 95 wt. % of the emulsion.

9 Claims, No Drawings

AQUEOUS FOAM QUENCHING COMPOSITIONS

FIELD OF THE INVENTION

The present invention relates to novel aqueous foam control formulations which have low viscosity, are efficient foam control additives, are stable on dilution with water, and produce low actives dilutions in water which are free from oil and non-dispersible particles. These formulations are useful as foam control additives in textile bleaching, washing or dyeing formulations.

BACKGROUND OF THE INVENTION

Foam control compositions which are designed for use in aqueous systems may or may not contain water, but in both cases, they are, preferably, water dispersible. Their preparation and properties are well known and are already disclosed in the patent and scholarly literature. For example, DE 2626994, GB197254, DE 3013923, U.S. Pat. No. 5,543,082, JP 58007335 and the review articles listed below report the preparation of such formulations, their use as foam control additives in the textiles, food, agriculture and paper industries, and investigate their mechanism of action and deactivation.

R. S. Bhute, *J. Scient. Ind. Res.* 1971, vol 30, 241
K. Roberts et al, *Journal of Colloid and Interface Science,* 1977, vol 62, 264
S. Ross, *Chemical Engineering Process,* 1967, vol 63, 41

Silicone foam control formulations have been known in the art for many years and are widely recognised as being the most effective agents in a plurality of situations. They are formulated to be active in either aqueous or non-aqueous systems. In the case of the aqueous systems, the silicone foam control agent can be either an emulsion (water in oil, oil in water, or multiple phase) or a water dispersible composition. Silicone foam control agents in the form of an emulsion are widely used today.

The first step in the preparation of a silicone antifoam emulsion is the preparation of the silicone antifoam compound. This is typically a mixture of a silicone fluid and fine solid particles, frequently silica, that has undergone a heat treatment at 100–300° C. for several hours in the presence of catalysts, such as alkali silanolate or alkali hydroxide to increase effectiveness, as described, for example in U.S. Pat. Nos. 3,235,509 and 3,560,401. Often, the antifoam compound also contains non-silicone oils (EP 687725, WO 95 05,580, CN 1 088 128) to improve performance or compatibility in certain applications.

Antifoam compounds such as these described above can not be easily used as such in aqueous systems because they do not disperse easily in water. This not only reduces their potency but it may cause other undesirable effects, such as, silicone spotting of fabrics in textiles. It is thus indispensable that they be made water compatible.

Water compatibility can be achieved by either blending surfactants in with the antifoam compound (U.S. Pat. Nos. 3,984,200, 4,076,648, JP 05261206) to produce self-emulsifiable compounds, or by emulsifying the antifoam compound to an oil in water or multiple phase emulsion. While there exists a large patent literature on self-emulsifiable compounds, the majority of material commercially used is of the emulsion type. The main reason is ease of use: the antifoam emulsion can be easily and uniformly dispersed into an aqueous phase using only slight or moderate mixing.

The preparation of silicone antifoam emulsions, while appearing easy, is in fact complicated due to the numerous variables, demonstrated empirically, that affect performance. These can arise from changes in the composition of the antifoam compound, in the composition and nature of the emulsion, and in the nature of the foaming system.

The antifoam emulsion droplet size is one of the most important factors controlling the antifoam activity in a given foaming medium. Antifoam effectiveness however, is not the only requirement. In particular, in sensitive industries such as textiles, the antifoam emulsion quality is also of importance:

The emulsion viscosity should be low for ease of use
The emulsion should be stable to temperatures as high as 50° C.
The emulsion once diluted with water, should be free of unemulsified oil and non-dispersed solid particles.

In addition, textile formulators require that the emulsion, when diluted with water, form stable dilutions that they can then sell at a profit. This is a particularly difficult prerequisite. Effective antifoam emulsions use thickeners in amounts optimised for the undiluted emulsion to prevent droplet creaming and coalescing. Upon dilution with water, the thickener levels are drastically reduced and are thus no longer capable of imparting the required stability: the diluted emulsion separates. The separation may not be obvious, as, in certain cases, there is no phase separation visible to the naked eye. However, if the diluted emulsion be tested for antifoam efficiency, it will be found that either the top or the bottom layer (depending on whether the droplets are lighter or heavier than the continuous phase) have retained efficiency. The rest of the dilution, being depleted of antifoam droplets, exhibits drastically reduced foam control.

A way to overcome this would be to use higher quantities of thickeners but this would result in an unacceptably high emulsion viscosity. Alternatively, the emulsion droplet could be made smaller through processing (eg, homogenising) to achieve the required stability, but then the effectiveness of the antifoam would be reduced.

European Patent No 0 769 548 teaches the preparation of silicone antifoam emulsions using alkylpolyglucosides and anionic surfactants as the emulsifiers and xanthan gum as the thickener. The antifoam compound is based on a blend of silicone oil and hydrophobic silica. The finished formulation is stable for 180 days at 40° C. and exhibits foam control.

German Patent No 42 37 754 teaches the use of linear polyurethane dispersions or emulsions as protective colloids in the preparation of silicone antifoam emulsions. The emulsifiers are non-ionic polyethylene oxide modified triglycerides or alcohol ethoxylates. The antifoam compound is based on a silicone oil and hydrophobic silica. The finished formulation exhibits foam control and stability in a variety of latexes.

German Patent No 30 13 923 teaches the use of water soluble molecules having the general formula $R^1\{CH_2CH(R^2)O\}R^3$ where $R^1$ is either an alkyl or alkoxy group, $R^2$ is either hydrogen or methyl and $R^3$ is an alkyl group for the preparation of silicone antifoam emulsions. These compounds help in the emulsification and improve the dispersibility and foam control efficiency of the emulsion. The emulsifiers are non-ionic triglycerides and alcohol ethoxylates. The antifoam compound is based on a blend of a silicone oil and hydrophobic silica. No thickeners or protective colloids are disclosed in this patent. The finished emulsion has low viscosity and exhibits foam control.

German Patent No 43 43 185 teaches the use of polyalkylene oxide modified siloxanes as emulsifiers for silicone antifoam compounds that are based on blends of polyalkylene oxide modified siloxanes and hydrophobic silica. The siloxane chain is either linear or branched and the polyalkylene oxide moiety is either pendant or end-blocked. No protective colloids or thickeners are disclosed in this patent. The final emulsion showed compatibility and foam control in acrylic latexes.

The limitation of the formulations described in the patents above is that they do not embody all the requirements that an emulsion destined for the textiles market demands.

SUMMARY OF THE INVENTION

It has been found, surprisingly, that certain silicone antifoam emulsions of low viscosity, exhibit excellent bulk and dilute stability, have high efficiency in non-ionic and anionic foamant systems both at ambient and at an elevated temperature, and their dilutions with water do not separate. These emulsions contain silicone antifoam compounds based on polydimethylsiloxanes and silicas emulsified using non-ionics and silicone polyether copolymers as surfactants, thickened with anionic carboxylates or polysaccharides, and protected against creaming and separation using synthetic protective colloids. In addition, they contain freeze/thaw additives and biocides.

Accordingly, the instant invention comprises antifoam compound compositions prepared by a catalysed interaction between a polydiorganosiloxane component and fine solid particles (filler) bearing on the surface thereof a polydiorganosiloxane component.

One aspect of the present invention is antifoam emulsions useful for control of foam in aqueous foaming systems which comprise:

(A) polydiorganosiloxane;

(B) fine solid particles of inorganic oxide, bearing on the surface thereof a polydiorganosiloxane component; wherein the total amount of polydiorganosiloxane present in components (A) and (B) comprises 5 wt % to 60 wt % of the emulsion and the weight ratio of the total amount of polydiorganosiloxane present in components (A) and (B) to the amount of said inorganic oxide is 10:1 to 200:1;

(C) an organic surfactant dispersing agent selected from the group consisting of non-ionic tetrafunctional block copolymers terminating in primary or secondary hydroxyl groups and mixtures thereof, which agent comprises 0.1 wt % to 36 wt % of said emulsion;

(D) a block copolymer of polydimethylsiloxane with one or more blocks of polyalkylene oxide, the molecular weight of the polydimethylsiloxane portion being 300 to 100,000 Daltons and the total molecular weight of all polyalkylene oxide blocks present being 100 to 40,000 Daltons, which copolymer compries 0.1 wt. % to 20 wt. % of said emulsion;

(E) a non-ionic surfactant component comprising one or more non-ionic surfactants not conforming to agent (C) nor to copolymer (D) and comprising 1 wt % to 60 wt % of said emulsion;

(F) a thickener component which comprises 0.01 wt % to 15 wt % of said emulsion;

(G) a protective colloid component which comprises 0.01 wt. % to 10 wt. % of said emulsion; and (H) water comprising up to 95 wt. % of the emulsion.

Another aspect of the present invention is a process for the preparation of the antifoam compound comprising in a first step blending the polydiorganosiloxane, the filler and a catalyst component which is basic material, preferably alkali hydroxide, a solution of alkali hydroxide in an organic solvent or alkali silanolate, and then reacting them at a temperature of 50–300° C. for several hours, so that some of the polydiorganosiloxane becomes bound to the filler particle surfaces; and then, preferably following cooling to ambient temperature.

A preferred aspect of the instant invention is antifoam emulsions which comprise:

antifoam compound;

organic surfactant dispersing agent of a non-ionic tetrafunctional block copolymer terminating in primary or secondary hydroxyl groups for assisting in dispersing the antifoam compound in the water of the emulsion;

non-ionic emulsifier;

silicone polyether copolymer, optionally, but preferably, water insoluble at ambient temperature;

primary thickener, preferably polysaccharide based;

secondary thickener, preferably polycarboxylate based;

protective colloid, preferably polyvinylpyrrolidone based;

optionally, but preferably, a freeze/thaw component;

optionally, but preferably, a preservative or biocide;

optionally, but preferably, a neutralising agent;

water.

It is also an object of the instant invention to provide a process for the preparation of the antifoam emulsion, said process comprising:

the preparation of Blend A, said Blend comprising antifoam compound, non-ionic emulsifier, and protective colloid;

the preparation of Blend B, said Blend comprising Blend A, non-ionic emulsifier, water and a freeze/thaw additive;

the preparation of Blend C, said Blend comprising water, Blend B, thickener, protective colloid, preservative, and neutralising agent.

These antifoam emulsions are characterised in that they possess low viscosity, they have excellent bulk and dilute stabilities, their water dilutions do not separate on standing for prolonged periods, they exhibit a strong antifoam effect, and they are freeze/thaw stable.

DETAILED DESCRIPTION OF THE INVENTION

The polydiorganosiloxane used in the present invention can be either linear or branched. The repeating unit has exclusively the general formula $R^1R^2SiO_{2/2}$ for the linear type or $R^1SiO_{3/2}$ and $R^2SiO_{2/2}$ for the branched type where each occurrence of $R^1$ and $R^2$ denotes a $C_1$ to $C_6$ alkyl, aryl, or $C_1$ to $C_6$ alkoxy radical, such as methyl, ethyl, propyl, butyl, phenyl, methoxy, ethoxy, or propoxy groups. The end groups of the polymer have the general formula $R^3R^4R^5SiO_{1/2}$, where each occurrence of $R^3$, $R^4$, and $R^5$ denotes a $C_1$ to $C_6$ alkyl, aryl, or $C_1$ to $C_6$ alkoxy and/or hydroxy radical, such as methyl, ethyl, propyl, butyl, phenyl, methoxy, ethoxy, or propoxy groups. For the purpose of the present invention, it is preferred that $R^1$, $R^2$, $R^3$, $R^4$ and $R^5$ be methyl radicals. The kinematic viscosity of the polydiorganosiloxane component should be in the 50 to 20,000,000 centistokes range, preferably between 100 and 12,000,000 centistokes. The concentration of the polydiorganosiloxane component is preferably about 5 to 60% by weight of the emulsion.

The finely divided solid particulate component, frequently called "filler", can be either inorganic or organic in nature. Inorganic fine particulate matter suitable for the present invention can be either an inorganic oxide or silicate. Organic particulate matter suitable for the present invention can be a fatty acid amide such as ethylene bis stearamide or a polyethylene wax with a melting point of at least 80° C. Silica is preferred as the particulate material. The silica can be fumed, precipitated or aerogel and in either hydrophilic or hydrophobized form. While silica is preferred in this invention, fine particles of other materials, such as alumina ($Al_2O_3$), titania ($TiO_2$), zirconia ($ZrO_2$), amorphous alumino-silicates or their combinations with each other or with silica can be used. The filler particles should have a specific BET surface area of about 40 to 400 $m^2/g$. The filler can be either hydrophilic, that is, untreated, or hydrophobized. The concentration of the filler particles in the antifoam compound should be set so that the ratio of the total amount of the polydiorganosiloxane present in the antifoam compound to the amount of the filler particles is about 10:1 to 200:1.

The polydiorganosiloxane component and the filler component are combined so that some of the polydiorganosiloxane becomes bound to the surface of the filler particles. The term "bound" is used herein to mean that polydiorganosiloxane is present on, and remains on, the particle surfaces during and following the preparation of the emulsion according to the present invention. The behavior of the polydiorganosiloxane on the particle surfaces is consistent with its being covalently bound thereto, but the actual nature of the attachment of the polydiorganosiloxane to the particle surface is not critical so long as the attachment exists.

The attachment of the polydiorganosiloxane to the particle surfaces can be effected either by simply heating the raw materials at 50–300° C. for a duration of 1–36 hours, or is preferably effected with the aid of a catalyst at a temperature of 100–220° C., preferably 150–200° C., for a period of 1–24 hours, preferably 6–18 hours. As reaction catalyst either at least one basic or acidic material may be used. The preferred catalyst is alkali hydroxide, such as KOH, NaOH etc., or alkali silanolate, such as potassium-silanolate or sodium-silanolate. Other basic materials, such as alkali or alkaline earth metal oxides, hydroxides and silanolates; monoalkyl, dialkyl, and trialkyl amines; and tetraalkylammonium hydroxides and silanolates can also be used as catalyst. Typical examples of these catalysts include sodium, potassium, cesium, calcium, magnesium or strontium oxide, hydroxide or silanolate and their combinations. Each alkyl group in an amine catalyst typically can be a $C_1$ to $C_{16}$ alkyl group, such as methyl, ethyl, propyl, butyl, decyl, dodecyl, or hexadecyl, or one of the alkyl groups can be replaced by a phenyl group. The kind of catalysts that can be used in this invention are siloxane equilibration catalyst such as those described in the book "Chemistry and Technology of Silicones", by Walter Noll, Academic Press, 1968, Chapter 5. The catalyst is preferably used in an effective amount on the order of 0.1% to 10% by weight of the combined amount of polydiorganosiloxane and filler present, and preferably 0.5% to 5% by weight thereof.

In order to facilitate the emulsification of the antifoam compound there is included in the antifoam agents at least one organic surfactant dispersing agent of a non-ionic difunctional or tetrafunctional, preferably tetrafunctional, block copolymer terminating in primary or secondary hydroxyl groups for assisting in dispersing the antifoam compound in the water of the emulsion. As used herein, "difunctional" and "tetrafunctional", respectively mean disubstituted and tetrasubstituted with said hydroxyl substitution. Surfactants of the difunctional type are well known in the art as exemplified in European Patent No 254,499. The tetrafunctional types are derived from the sequential addition of propylene oxide and ethylene oxide to ethylene diamine. Any such difunctional or tetrafunctional block copolymer may be used in the present invention. Tetrafunctional block copolymers terminating in hydroxyl groups with a molecular weight of 1600 to 30000 Daltons, preferably from 2000 to 8000 Daltons and most preferably from 3000 to 8000 Daltons, Hydrophilic-Lipophilic Balance of maximum 7 and with an aqueous cloud point of maximum 35° C. are preferred.

Said Hydrophilic-Lipophilic Balance, hereinafter HLB, is a measure of the balance of the size and strength of the hydrophilic ("water loving" or polar) and the lipophilic ("oil-loving" or non-polar) groups of a surface active agent. The HLB of a surface active agent is related to its solubility and cloud point in an aqueous solution (aqueous cloud point). A surface active agent having a low HLB will tend to be oil soluble and have a low aqueous cloud point, while one having a high HLB will tend to be water soluble and have a high aqueous cloud point. The HLB methods for determining the characteristics of a surface active agent are well known in the art and can be found more fully explained e.g. in "The Atlas HLB System a time saving guide to emulsifier selection", 4th Printing May, 1971, published by the Atlas Chemical Industries, Inc., Wilmington, Del., (now known as ICI United States Inc.). The term cloud point refers to the temperature at which a solution of the surfactant becomes cloudy and phase separation occurs. At this temperature the surfactant is no longer soluble and separates. When the solution is water based this is referred to as the aqueous cloud point.

The concentration of the hydroxyl-terminated organic surfactant dispersing agent can vary between 2% and 60% on the weight of the antifoam emulsion, preferably between 10% and 60% on the weight of the antifoam emulsion.

In addition to the foregoing hydroxyl-terminated organic surfactant dispersing agent, at least one non-ionic emulsifier component is necessary to produce the antifoam emulsion. Any non-ionic surface active agent can be employed in this invention. The non-ionic surface active agent can be a non-ionic organic surface active agent or a non-ionic siloxane surface active agent. The concentration of the non-ionic surface active agent can vary between 10% and 200% on the weight of the antifoam compound, preferably between 20% and 100% on the weight of the antifoam compound. The function of the non-ionic surface active agent is to help effect emulsification. Another function of this component is to stabilise the dispersed antifoam emulsion drops from coalescence.

The non-ionic emulsifier component is comprised of one or more than one non-ionic emulsifiers. Preferably the non-ionic emulsifier is comprised of silicone based and/or organic based surfactants.

Useful organic based surfactants include polyoxyethylene-alkyl ethers (alcohol ethoxylates) such as oleochemical alcohol ethoxylates such as lauryl-myristyl alcohol ethoxylates, cetyl-stearyl alcohol ethoxylates, cetyl-oleyl alcohol ethoxylates, petrochemical or synthetic alcohol ethoxylates such as the Ziegler fatty alcohol ethoxylates, the oxo-alcohol ethoxylates, the branched oxo-alcohol ethoxylates, the isotridecyl alcohol ethoxylates, the 2-ethylhexanol ethoxylates, the nonyl phenol ethoxylates and the octyl phenol ethoxylates, ethylene oxide/propylene oxide copolymers, fatty acid alkyl esters and their ethoxylates, glyceryl-lacto esters of fatty acids, such as glyceryl lactooleate, glyceryl fatty acid mono- and di-esters, such as glyceryl monostearate, glyceryl monooleate, glyceryl monolaurate or glyceryl 5-hydroxydecanoate, lactylated fatty acid esters of glycerol and propylene glycol, polyglycerol esters of fatty acids, fatty acid monoglyceridyl citrates, fatty acid polyoxyethylene esters with 10–40 moles of ethylene oxide, such as polyoxyethylene 40 monostearate, polyoxyethylene dioleate, polysorbate 20, polysorbate 60, polysorbate 65, polysorbate 80, propylene glycol mono- and diesters of fatty acids, fatty acid sorbitan mono- and di-esters, such as sorbitan monooleate or sorbitan monostearate, sucrose fatty acid esters, diacetyl tartaric acid esters of monoglycerides, acetic acid esters of monoglycerides, and lecithin. Non-ionic surface active agents and/or methods for their preparation which are useful in this invention are well known in the art as witnessed for example by "McCutcheon's Detergents and Emulsifiers", North America Ed. 1975 Annual, McCutcheon Division M. C. Publishing Co., Ridgewood, N.J. the disclosure of which is incorporated herein by reference thereto.

It is preferred in this invention to combine at least two emulsifiers, one with a low HLB (2–6) and another with a high HLB (6–20). Low HLB emulsifiers are, for example, propylene glycol monostearate, glyceryl monooleate, sorbitan monostearate, sorbitan tristearate or glyceryl lactopalmitate. High HLB emulsifiers are, for example, glyceryl monolaurate, polyoxyethylene (40) monostearate, polysorbate 60, polysorbate 65, polysorbate 80 or decaglycerol monooleate.

Illustrative commercial examples of the high HLB non-ionic organic surface active agents are the Myrj surfactants of ICI United States Inc., the Tergitol surfactants of Union Carbide Corporation, and the like. Illustrative commercial examples of the low HLB non-ionic organic surface active agents include, eg., certain Atmos, Atmul, Arlacel, Atpet, Span, Tween, and Brij surfactants of ICI United States Inc., and the like.

The silicone based emulsifiers which can be used in this invention preferably include at least one block copolymer of polydimethylsiloxane with one or a combination of several polyalkylene oxides. This copolymer can have a comb-type structure or an A-B or A-B-A type structure. The molecular weight of the polydimethylsiloxane part of the block copolymer should be about 300–100,000 Daltons. The polyalkylene oxide part of the silicone based block copolymer comprises preferably one or both of polyethylene oxide and polypropylene oxide. The molecular weight of the polyalkylene oxide blocks in the silicone based emulsifier component is about 100–40,000 Daltons. The ratio of the polyethylene and polypropylene oxide blocks in the non-ionic block copolymer is preferably about 0–60%, respectively. These surfactants are well known in the art and are exemplified by the "dispersing agents" disclosed by Keil in U.S. Pat. Nos. 3,784,479 and 3,984,347.

The concentration of the silicone polyether copolymer can vary between 0.1% by weight and 20% by weight on the weight of the final emulsion.

It is also possible to include in the composition of this invention a polyalkylene oxide component, which is preferably polypropylene glycol, as solvent. The concentration of this component should be about 5–50% of the final composition. The molecular weight of the polypropylene glycol is about 500–10,000 Daltons, preferably about 500–2000 Daltons.

In order to stabilise the antifoam emulsion, at least one thickener component should be present. Rheology modifiers or thickeners of usefulness in the present invention are polycarboxylate materials. These have at least 60% by weight of segments with the general formula

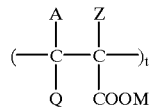

wherein A, Q, and Z are each selected from the group consisting of hydrogen, methyl, carboxy, COOM, carboxymethyl, hydroxy, and hydroxymethyl, M is hydrogen, alkali metal, ammonium or substituted ammonium and t is from 30 to 400. Preferably A is hydrogen or hydroxy, Q is hydrogen or carboxy and Z is hydrogen. Suitable polymeric polycarboxylates include polymerised products of unsaturated monomeric acids, e.g., acrylic acid, maleic acid, maleic anhydride, fumaric acid, itaconic acid, aconitic acid, mesaconic acid, citraconic acid, and methylenemolanic acid. The copolymerisation with lesser amounts of monomeric materials comprising no carboxylic acid, e.g., vinylmethyl, vinylmethylethers, styrene, 1,9-decadiene, ethylene is desirable to the use of the polycarboxylates in the foam control agents of the present invention. Particularly useful polycarboxylate thickener components in this invention are copolymers of methyl vinyl ether with maleic anhydride. Copolymers of methyl vinyl ether with maleic anhydride based thickeners are large molecular weight, cross-linked polymer resins of maleic anhydride and its derivatives. These materials are hydrophilic, water-swellable and extremely effective thickeners in aqueous or polar solvent based liquids. Typical commercial copolymers of methyl vinyl ether with maleic anhydride based thickeners which are useful include the Stabileze products of ISP. These products are available in powdered form, such as Stabileze 06 or Stabileze QM. The copolymers of methyl vinyl ether with maleic anhydride based thickeners work effectively only if they are allowed to hydrolyse and then be neutralised with a basic material. If neutralised to about pH 5–11, preferably 6–9, the copolymers of methyl vinyl ether with maleic anhydride thickeners give high viscosity and gel structure to aqueous or polar solvent based liquids which can stabilise emulsions. Based on these requirements a neutralising agent should be added to the emulsion in a concentration which is necessary to set the pH of the antifoam emulsion close to neutral (pH 6 to 9), if a copolymer of methyl vinyl ether with maleic anhydride based thickener is used. As neutralising agent various types of basic materials can be used. Typical useful neutralising agents are alkali and ammonium hydroxides, carbonates, hydrogen carbonates, acetates or alkaline earth oxides, hydroxides, carbonates, acetates or any other alkali or alkaline earth salts which can neutralise maleic acid. Organic amine bases including monoalkyl, dialkyl, trialkyl amines, tetraalkylammonium hydroxides, monoethanolamine, diethanolamine, triethanolamine (TEA), aminomethylpropanol, aminomethylpropanediol, diisopropanolamine (DIPA), aminomethyl propanol, tromethamine, sodium hydroxymethyl glycinate, and tetrahydroxypropyl ethylenediamine can also be used as neutralising agents.

A polysaccharide type thickener can also be used instead of or in addition to the polycarboxylate based thickeners in the foam control compositions of this invention. Useful polysaccharides include non-ionic unmodified polysaccharides such as microcrystalline cellulose (trade names: Avicell, Microquick, FMC Corporation), wheat, corn (maize), and rice starch, gum arabic, gum tragacanth, and guar flour, non-ionic modified polysaccharides such as starch products examples of which include the hot-water-soluble heat-treated starches ("British gum"; trade names: Diatex, Diamalt), and the cold-water-soluble heat-treated swelling starches (trade names: Diatex SL, Diamalt), the non-ionic starch ethers and starch esters (trade names: Solvitose H and H4, Avebe; Texogum 3013, Diamalt), the gum resins (trade names: Karagum Super, Diamalt; Lamegum, Chem. Fabrik Grunau; Nafka Kristallgummi, Avebe;), the galactomannans such as carob flour, and guar derivatives (trade names: Solvitose, Avebe; Polygum, Polymer Industries ; Diagum, Diamalt), and the cellulose derivatives such as the methyl, ethyl, hydroxyethyl, hydroxypropyl, hydroxypropyl methyl, and hydroxyethyl methyl derivatives of cellulose (trade names include: Cellosize, Union Carbide; Natrosol M R, Hercules), and anionic polysaccharides such as alginates (trade names include: Alginate, SFC ; Keltex, Kelco; Dialgin, Diamalt), biopolysaccharides such as xanthan (trade names include: Kelzan, Kelco; Rhodopol, Rhone-Poulenc), and carboxymethylated polysaccharides such as anionic starch ethers (trade names include: Monagum V, Diamalt; Solvitose C5, Avebe), anionic etherified seed flours such as those based on guar, and carboxymethylcelluloses and their sodium salts (trade names include: CMC Cellulose Gum, Hercules; Courlose, British Cellanese; Tylose C600, Hoechst). Particularly useful polysaccharides for the present invention are the anionic polysaccharides and especially the carboxymethylcelluloses and their sodium salts. These materials do not require a neutralisation step, however, it is important that they be well dispersed in the aqueous phase of the emulsion in order to be effective.

In order to further stabilise the antifoam emulsion it is necessary to use one or more than one protective colloids. Protective colloids that are well known in the art stabilise aqueous foam control compositions through a number of mechanisms which include amongst others viscosity increase of the continuous phase, steric stabilisation or electrostatic stabilisation. Examples of such protective colloids include the cellulosic derivatives such as methylcellulose, carboxymethylcellulose, hydroxyethylcellulose, hydroxypropylcellulose, and hydroxypropylmethylcellulose, synthetic polymers such as copolymers of poly(methyl vinyl ether/maleic anhydride), polyvinylalcohol, polyacrylates and other polycarboxylates, polyurethanes, and polyvinylpyrrolidone and its derivatives and also biosynthetic polymers such as xanthan gum. Protective colloids that are particularly useful in this invention are polymers of polyvinylpyrrolidone, copolymers of polyvinylpyrrolidone and polyalkylatedvinylpyrrolidone, copolymers of polyvinylpyrrolidone with vinyl esters, and copolymers of polyvinylpyrrolidone with vinyl acetate. Such polymers are commercially available under the trade names of Kollidon, Luviskol, Albigen A, Collacral, Luviskol VA, and Divergan from BASF, PVP/VA from General Aniline and Film Corporation, PVP, Antaron, and Gantrez A N from ISP. Especially useful are the copolymers of polyvinylpyrrolidone and poly(alkylatedvinylpyrrolidone).

Polyvinylpyrrolidone and poly(alkylatedvinylpyrrolidone) have the general structure:

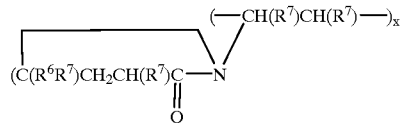

where $R^6$ and $R^7$ can be either hydrogen or an alkyl group. In the case where $R^6$ and $R^7$ are both hydrogen, the structure corresponds to polyvinylpyrrolidone. Polyvinylpyrrolidone polymers are available in several molecular weight grades, ranging from low, 2500 Daltons, to very high molecular weight, 3000000 Daltons. There are different methods for the determination of the molecular weight such as light scattering, osmometry, NMR spectroscopy, ebulliometry, and size exclusion chromatography. By the use of these methods, anyone of three molecular weight parameters can be measured, namely the number average, viscosity average, and weight average molecular weights. Each of these characteristics can yield a different value for the same polymer. It is for this reason that, conventionally, molecular weights for polyvinylpyrrolidone polymers are expressed by their "K-values", which are based on kinematic viscosity measurements. The K-values assigned to different grades of polyvinylpyrrolidone polymers represent a function of the average molecular weight, the degree of polymerisation, and the intrinsic viscosity. The K-values are derived from viscosity measurements and are calculated according to Fikentscher's formula. The higher the K-values the higher the molecular weight of the corresponding polyvinylpyrrolidone polymer. Commercially available polyvinylpyrrolidone polymers have K-values ranging from 10 to 130. Polyvinylpyrrolidone polymers that are particularly useful as protective colloids in the present invention have K-values of 10 to 60.

In the case where $R^6$ and $R^7$ are either hydrogen or alkyl groups, lipophilic groups are introduced into the polyvinylpyrrolidone structure resulting in the formation of linear copolymers of the heterocyclic monomer and long chain alpha-olefins. These copolymers are commonly called poly (alkylated vinyl pyrrolidone) polymers and have molecular weights that range from 7000 Daltons up to 20000 Daltons. Poly (alkylated vinyl pyrrolidone) polymers particularly useful in the present invention are those modified with alkyl groups having either 16 or 20 carbon atoms.

The relative amounts of the rheology modifiers (thickeners) and protective colloids that can be used in the present invention are such that their combined effect does not result in the viscosity of the final antifoam emulsion to exceed 3000 cSt. Thus, the rheology modifiers (thickeners) are present in not more than 15%, preferably not more than 7% in the final antifoam emulsion, whereas the protective colloids are present in not more than 10%, preferably not more than 5% in the final antifoam emulsion.

A preservative can also be present in the composition of the present invention in order to prevent microbial growth in the antifoam emulsion during storage. Most of the commercial preservative or biocide products are usable for preparing the antifoam emulsion of the present invention. Examples of such products are Ucarcide 250 (glutaraldehyde) from Union Carbide, Kathon CG/ICP from Rohm and Haas. If the antifoam concentrate is to be used in food applications then any food preservative, such as acetic acid, sorbic acid, lactic acid, propionic acid, benzoic acid and their salts or parabens and their combinations can be used, in accordance with the respective food regulations. The concentration of the biocide depends on the strength of the biocide and the extent of protection demanded from it. Typically a biocide will be used at levels ranging from 1.5 to 0.05% in the final antifoam emulsion.

An additive can be used to protect the antifoam emulsion in case it experiences temperatures lower than 0° C. Such an additive is typically referred to as a freeze/thaw additive. Typical freeze/thaw additives are monohydric or polyhydric alcohols such as methanol, ethanol, propanol, ethylene glycol, propylene glycol, dipropylene glycol, glycerol, isopropyl alcohol, 1-methoxy-2-propanol. The amount of the freeze/thaw additive to be used can vary between 0.5 and 10% in the final antifoam emulsion, preferably 1 to 5% in the final antifoam emulsion. A freeze/thaw additive that is particularly useful in the present invention is propylene glycol.

The preparation of the antifoam emulsion is a two-step process. In the first step of the preparation an antifoam compound is made by blending and reacting the polydiorganosiloxane, particulate, and catalyst components. A possible way of addition is starting with the polydiorganosiloxane, then adding the fine solid particles under intensive mixing, and finally blending the catalyst, if any. The sequence of addition is, however, not critical. After a homogeneous mixture is obtained, it is heated to 50°–300° C. for several hours. During heating the blend can be mixed. After this heating step during which a reaction can take place between the surface hydroxyl groups of the filler and the polyorganosiloxane under the influence of the catalyst, the antifoam compound is cooled to ambient temperature and stored until further use.

In the second step the antifoam emulsion is made. The preparation of the antifoam emulsion entails, in a first step the preparation of Blend A, said blend comprising antifoam compound, non-ionic surfactant emulsifier, and protective colloid. The order of addition of the different materials is not narrowly critical. However, it is preferred that the protective colloid be added last as a blend with a non-ionic surfactant. Blend A is mixed till fully homogeneous. The temperature of mixing is not narrowly critical, it can range from 5° C. to 100° C., but it is preferred that it be between 5° C. and 45° C. In a second step, Blend B is prepared, said blend comprising Blend A, non-ionic emulsifier, water and freeze/thaw additive. The order of addition of the different materials is not narrowly critical. It is preferred however, that Blend A be added first. Blend B is mixed till fully homogeneous. The temperature of mixing is not narrowly critical, it can range from 5° C. to 80° C., but it is preferred that it be between 25° C. and 65° C. In a third step, the final emulsion is prepared, said final emulsion comprising Blend B, thickener, protective colloid, preservative, and neutralising agent. The order of addition of the different materials is not narrowly critical. However, it is preferred that Blend B be added first. The temperature of mixing is not narrowly critical, it can range from 5° C. to 80° C., but it is preferred that it be between 15° C. and 65° C. Mixing throughout the different steps can be effected with any appropriate means to ensure homogeneity. It is preferred that the type of mixers used are those in which turbulent flow conditions prevail. Examples of such mixers include turbine agitated vessels, pipes, jet mixers, sparged systems, high-speed shear mixers, rotor-stator mixers, and static mixers with a high Re number. The final emulsion can be further treated with high shear devices such as a colloid mill, valve homogeniser, ultrasonic homogeniser, or sonolator.

TEST METHODS

The viscosity of the antifoam emulsion was measured using a Brookfield LV viscometer equipped with spindle No 3 at a rotational speed of 30 rpm. A sample was accepted if the viscosity was below 1500 cSt, preferably below 1000 cSt.

The quality of the emulsion diluted to 3% as received in water, e.g., 3 g of the emulsion mixed with 97 g of water, was tested by visual observation. The diluted emulsion was observed in transparent light. The quality of the emulsion was acceptable if no particles larger than a few tenths of a millimeter could be observed and when no unemulsified oil developed immediately and after standing for 30 min.

Each emulsion was subjected to shaking, using a Burrell wrist-action shaker for 30 seconds in order to measure the foam height one minute after the shaking stopped. This was repeated ten times. The foam height is the addition of the individual foam heights. The amount of antifoam emulsion added was such that it resulted in 150 ppm of silicone fraction in the foamant liquor which was a 0.5% aqueous solution of sodium dodecyl sulfonate.

EXAMPLES

Example 1

The following thickeners/protective colloids were investigated:

| Thickener/Protective Colloid | Abbreviation |
|---|---|
| Carbopol 934 | A |
| Blanose 9M31XF | B |
| PVP K-30 | C |
| Antaron V-216 | D |
| Stabileze QM | E |
| Carbopol 981 | F |
| Blanose 7L2C | G |
| Avicell CL611 | H |
| Microquick WC 595 | I |
| Natrosol 250LR | J |
| Cellosize QPO9H | K |
| Acusol 830 | L |

100 g polydimethylsiloxane having a viscosity of 500 cSt at 25° C., and 3 g of finely divided fumed amorphous silica having an average particle size of 7 millimicrons and a BET surface area of 325 m$^2$/g were blended together. Into this blend, 0.04% of K+ as potassium silanolate was well dispersed. The resulting mixture was heated to 150° C. for 5 hours and then cooled to ambient to provide a silicone antifoam compound.

5.33 g of a homogeneous blend of cetyl-stearyl alcohol ethoxylates of high (16.2) and low HLB (6) blended at a ratio so that the overall HLB of the system was 9.3 were mixed with 40.63 g of the antifoam compound prepared above followed by the addition of a certain amount (weight A) of thickener/protective colloid polymer. A few minutes later, 155.15 g of a blend of thickener/protective colloid (weight B) and water was added, followed by 0.1 g of neutralising agent and 0.12 g Piror P-840.

The aqueous antifoam compositions so prepared are listed below along with the identified thickener and protective colloid, their respective weights and viscosity of the finished emulsion. In the Table below TEA stands for triethanolamine:

| Thickener/ Protective Colloid | Neutralising agent | Weight A/gr | Weight B/gr | Viscosity/cSt, 25° C. |
|---|---|---|---|---|
| A,G | NaOH | 0.3 | 2.03 | 1550 |
| A,G | NaOH | 0.2 | 2.04 | 1200 |
| A,G | NaOH | 0.1 | 2.04 | 1000 |
| A,H | NaOH | 0.1 | 2.01 | 1300 |
| A,H | NaOH | 0.11 | 1.65 | 1000 |
| A,H,G | NaOH | 0.3 | 3.2 | 16700 |
| A,I | NaOH | 0.25 | 2.03 | 2400 |
| G,J | NaOH | 2.02 | 2.03 | 176 |
| A,J | TEA | 0.32 | 2.24 | 2000 |

-continued

| Thickener/ Protective Colloid | Neutralising agent | Weight A/gr | Weight B/gr | Viscosity/cSt, 25° C. |
| --- | --- | --- | --- | --- |
| I,C,J | TEA | 4.01 | 3.37 | 130 |
| F,G,C | TEA | 1.92 | 2.15 | 1300 |

Example 2

75.04 g of a polydimethylsiloxane having a viscosity of 100 cSt at 25° C., 251.01 g of a polydimethylsiloxane having a viscosity of 500 cSt at 25° C. and 50.50 g of a finely divided fumed hydrophobic silica having an average particle size of 7nm and a BET surface area of 260 m$^2$/g were mixed under high shear until the silica was well dispersed. 50.09 g of a polydimethylsiloxane having a viscosity of 350 cSt at 25° C., 75.54 g of a polydimethylsiloxane having a viscosity of 12 million cSt at 25° C. and 5.07 g of 10% by weight solution of KOH in isopropanol were mixed in. The mixture was heated under shear at 165° C. for 36 h and then cooled to ambient.

50 g of this antifoam compound and 50 g of the antifoam compound prepared as described in Example 1 were mixed until homogeneous. This blend was added with mixing to a blend of 0.15 g of thickener F of example 1, 0.75 g of thickener G of example 1, 26.54 g of the blend of cetyl-stearyl alcohols of Example 1, and 363.04 g of water that had been prepared in advance at 60° C. After a few minutes, the blend was diluted with 500.19 g of water, neutralised with 2.09 g of TEA and preserved with 0.54 g of Piror P-840. This aqueous antifoam composition had a viscosity of 1100 cSt, total foam height of 154 mm, and had good appearance when diluted 3% in water.

Example 3

The same procedure and raw materials as in Example 2 were employed with the exception that the antifoam compound was replaced by a blend of the antifoam compound prepared in Example 2 with a mixture of oxygenated hydrocarbons, primarily aliphatic alcohols and aliphatic ethers having a density of 0.84 g/ml at 20° C. and a hydroxyl value of 55 mgKOH/g and a tetra-functional block copolymer derived from the sequential addition of propylene oxide and ethylene oxide to ethylenediamine having an average molecular weight of 3600 Daltons in a ratio of 10:3:3 respectively so that the amount of silicone antifoam compound was proportionately kept the same as in Example 2. This aqueous antifoam composition had a viscosity of 1340 cSt, total foam height of 59 mm, good appearance when diluted 3% in water and its dilution with water was stable for 3 days at ambient.

Example 4

283.5 g of a polydimethylsiloxane having a viscosity of 12500 cSt at 25° C. were mixed with 15.00 g of a hydrophobic silica having an average agglomerate size of 5 μm and a BET surface area of 90 m$^2$/g and 1.50 g of KOH and heated to 150° C. for 16 h and then cooled to ambient to provide a silicone antifoam compound.

A blend of 20.19 g of this antifoam compound and 8.13 g of a tetra-functional block copolymer derived from the sequential addition of propylene oxide and ethylene oxide to ethylenediamine having an average molecular weight of 3600 Daltons was blended at ambient with a blend of 0.12 g D 0.96 g of a silicone modified with polyethylene oxide groups having a molecular weight of 7800 Daltons and an estimated HLB of 10 and 0.06 g of a silicone modified with polyalkylene oxide groups having a molecular weight of 12500 Daltons and an estimated HLB of 12. The blend was then heated to 50° C. and mixed with 53.73 g of a blend of cetyl-stearyl alcohol ethoxylates of high (16.2) and low HLB (6) blended at a ratio so that the overall HLB of the system was 9.3, water and propylene glycol at a ratio of 10:75:25 respectively. The blend was then cooled down and 64.76 g of a blend of thickeners E and G of example 1 and water at a ratio of 0.3:2.3:97.4 was mixed in. 54.02 g of water and 0.11 g of Piror P-840 were subsequently mixed in. This aqueous antifoam composition had a viscosity of 860 cSt and good appearance when diluted 3% in water.

Example 5

40.03 g of the antifoam compound of Example 2 were mixed at 50° C. with 2.02 g of a water insoluble polyethylene oxide modified siloxane having a molecular weight of 10000 Daltons, 2.02 g of a water insoluble polyalkylene oxide modified siloxane having a molecular weight of 46000 Daltons and 4.02 g of a water insoluble polyalkylene oxide modified siloxane having a molecular weight of 23000 Daltons. 4.04 g of water were then added followed by 2.03 g of thickener B of example 1, 146.04 g of water and 0.14 g of Kathon LX. This aqueous antifoam composition had a viscosity of 1000 cSt and was freeze/thaw stable.

Example 6

40.6 g of the antifoam compound of Example 2 were mixed at 50° C. with 2.02 g of a water insoluble polyethylene oxide modified siloxane having a molecular weight of 10,000 Daltons, 4.03 g of a water insoluble polyalkylene oxide modified siloxane having a molecular weight of 46000 Daltons and 2.00 g of a water insoluble polyalkylene oxide modified siloxane having a molecular weight of 23,000 Daltons. 16.02 g of water were then added followed by 2.43 g of thickener L of example 1 and 0.23 g of morpholine, 133.61 g of water and 0.11 g of Kathon LX. This aqueous antifoam composition had a viscosity of 1000 cSt.

Example 7

4.57 g of a stearic acid ester modified with 40 ethylene oxide units having an HLB of 16.9, 12.72 of sorbitan monostearate having an HLB of 4.7, and 15 g of water were mixed at 85° C. till fully homogeneous. 40.78 g of the antifoam compound of Example 2 were slowly added and thoroughly mixed in. 1 g of thickener L of example 1 was mixed in and the blend was diluted with 127.32 g of water and 0.14 g of Kathon LX. This aqueous antifoam composition had a viscosity of 170 cSt.

Example 8

534.25 g of a polydimethylsiloxane of viscosity 12,500 cSt at 25° C., 60.13 g of a hydrophobic silica having an average agglomerate size of 5 μm, an average primary particle size of 18 nm and a BET surface area of 90 m$^2$/g and 6.02 g of KOH were mixed and heated to 150° C. for 16 hours and then cooled to ambient to produce an antifoam compound. To 1.14 of a blend of a silicone modified with polyethylene oxide groups having a molecular weight of 7800 Daltons and an estimated HLB of 10 and a poly (alkylatedvinylpyrrolidone) having an average molecular weight of 7300 Daltons and a relative viscosity of 1.009 as a 0.1% solution in toluene used in a ratio of 90.4:9.6 prepared at ambient was added a blend of 20.18 g of the antifoam compound prepared above and 8.03 g of a tetrafunctional block copolymer derived from the sequential addition of propylene oxide and ethylene oxide to ethylenediamine having an average molecular weight of 3600 Daltons and the two mixed initially at ambient and then at 50° C.

To this blend were added at 50° C. 52.67 g of a blend of a stearic acid ester modified with 40 ethylene oxide units having an HLB of 16.9 and sorbitan monostearate having an HLB of 4.7 blended at such a ratio so as to have an overall HLB of 9.5, propylene glycol and water blended at a ratio of 8.2:15.3:76.5 prepared in advance at 60° C. This mixture was then cooled down and 64.29 g of a blend of a copolymer of methyl vinyl ether and maleic anhydride crosslinked with 1,9-decadiene having an average particle size of less than $75\mu$ a sodium salt of a carboxymethylcellulose having a sodium content of between 7 and 8.9% and water at a ratio of 0.3:2.3:97.4 that had been prepared at 60° C. and then cooled down were added and mixed in. 54.7 g of water were then added followed by 0.12 g of Piror P-840. The aqueous antifoam composition so obtained had a viscosity of 484 cSt.

Example 9

447.68 g of a polydimethylsiloxane of viscosity 12500 cSt at 25° C., 50.20 g of a hydrophobic silica having an average agglomerate size of 5 μm, an average primary particle size of 18 nm and a BET surface area of 90 m²/g and 25.03 g of a 10% solution of KOH in isopropanol were mixed and heated to 150° C. for 16 hours to produce an antifoam compound.

To 1.13 g of a blend of a silicone modified with polyethylene oxide groups having a molecular weight of 7800 Daltons and an estimated HLB of 10 and a poly (alkylatedvinylpyrrolidone) having an average molecular weight of 7300 Daltons and a relative viscosity of 1.009 as a 0.1% solution in toluene used in a ratio of 90.4:9.6 prepared at ambient was added a blend of 20.13 g of the antifoam compound prepared above, 8.09 g of a tetrafunctional block copolymer derived from the sequential addition of propylene oxide and ethylene oxide to ethylenediamine having an average molecular weight of 3600 Daltons and 8.04 g of a mixture of oxygenated hydrocarbons, primarily aliphatic alcohols and aliphatic ethers having a density of 0.84 g/ml at 20° C. and a hydroxyl value of 55 mgKOH/g and mixed initially at ambient and then at 50° C. To this blend were added at 50° C. 53.61 g of a blend of cetyl-stearyl alcohol ethoxylates of high (16.2) and low HLB (6) blended at a ratio so that the overall HLB of the system was 9.3, propylene glycol and water blended at a ratio of 10:15:75 prepared in advance at 60° C. This mixture was then cooled down and 64.53 g of a blend of a copolymer of methyl vinyl ether and maleic anhydride crosslinked with 1,9-decadiene having an average particle size of less than $75\mu$ a sodium salt of a carboxymethylcellulose having a sodium content of between 7 and 8.9% and water at a ratio of 0.3:2.3:97.4 that had been prepared at 60° C. and then cooled down were added and mixed in. 45.81 g of water were then added followed by 0.12 g of Piror P-840 and 0.08 g of triethanolamine. The aqueous antifoam composition so obtained had a viscosity of 1812 cSt.

Example 10

To 1.13 g of a blend of a silicone modified with polyethylene oxide groups having a molecular weight of 7800 Daltons and an estimated HLB of 10 and a poly (alkylatedvinylpyrrolidone) having an average molecular weight of 7300 Daltons and a relative viscosity of 1.009 as a 0.1% solution in toluene used in a ratio of 90.3:9.7 prepared at ambient was added a blend of 20.16 g of the antifoam compound of example 8, 8.02 g of a tetrafunctional block copolymer derived from the sequential addition of propylene oxide and ethylene oxide to ethylenediamine having an average molecular weight of 3600 Daltons and 0.2 g of sodium lauryl ether phosphate and mixed initially at ambient and then at 50° C. To this blend were added at 50° C. 53.61 g of a blend of cetyl-stearyl alcohol ethoxylates of high (16.2) and low HLB (6) blended at a ratio so that the overall HLB of the system was 9.3, propylene glycol and water blended at a ratio of 10:15:75 prepared in advance at 60° C. This mixture was then cooled down and 64.29 g of a blend of a copolymer of methyl vinyl ether and maleic anhydride crosslinked with 1,9-decadiene having an average particle size of less than $75\mu$ a sodium salt of a carboxymethylcellulose having a sodium content of between 7 and 8.9% and water at a ratio of 0.3:2.3:97.4 that had been prepared at 60° C. and then cooled down were added and mixed in. 53.81 g of water were then added followed by 0.12 g of Piror P-840. The aqueous antifoam composition so obtained had a viscosity of 836 cSt.

Example 11

To 1.15 g of a blend of a silicone modified with polyethylene oxide groups having a molecular weight of 7800 Daltons and an estimated HLB of 10 and a poly (alkylatedvinylpyrrolidone) having an average molecular weight of 7300 Daltons and a relative viscosity of 1.009 as a 0.1% solution in toluene used in a ratio of 90.3:9.7 prepared at ambient was added a blend of 20.22 g of the antifoam compound of example 2 and 8.03 g of a mixture of oxygenated hydrocarbons, primarily aliphatic alcohols and aliphatic ethers having a density of 0.84 g/ml at 20° C. and a hydroxyl value of 55 mgKOH/g and mixed initially at ambient and then at 50° C. To this blend were added at 50° C. 53.61 g of a blend of cetyl-stearyl alcohol ethoxylates of high (16.2) and low HLB (6) blended at a ratio so that the overall HLB of the system was 9.3, propylene glycol and water blended at a ratio of 10:15:75 prepared in advance at 60° C. This mixture was then cooled down and 64.34 g of a blend of a copolymer of methyl vinyl ether and maleic anhydride crosslinked with 1,9-decadiene having an average particle size of less than $75\mu$ a sodium salt of a carboxymethylcellulose having a sodium content of between 7 and 8.9% and water at a ratio of 0.3:2.3:97.4 that had been prepared at 60° C. and then cooled down were added and mixed in. 53.61 g of water were then added followed by 0.2 g of triethanolamine and 0.11 g of Piror P-840. The aqueous antifoam composition so obtained had a viscosity of 1540 cSt.

Example 12

To 1.13 g of a blend of a silicone modified with polyethylene oxide groups having a molecular weight of 7800 Daltons and an estimated HLB of 10, a poly (alkylatedvinylpyrrolidone) having an average molecular weight of 7300 Daltons and a relative viscosity of 1.009 as a 0.1% solution in toluene and a silicone modified with polyalkylene oxide groups having a molecular weight of 12500 Daltons and an estimated HLB of 12 used in a ratio of 85:9.7:5.3 prepared at ambient was added a blend of 20.14 g of the antifoam compound of example 4 and 8.03 g of a tetra-functional block copolymer derived from the sequential addition of propylene oxide and ethylene oxide to ethylenediamine having an average molecular weight of 3600 Daltons and mixed initially at ambient and then at 50° C. To this blend were added at 50° C. 53.81 g of a blend of cetyl-stearyl alcohol ethoxylates of high (16.2) and low HLB (6) blended at a ratio so that the overall HLB of the system was 9.3, propylene glycol and water blended at a ratio of 10:15:75 prepared in advance at 60° C. This mixture was then cooled down and 65.41 g of a blend of a copolymer of methyl vinyl ether and maleic anhydride crosslinked with 1,9-decadiene having an average particle size of less than 75μ, a hydroxyethylcellulose polymer whose 5% aqueous solution has a viscosity of about 140 cSt at 25° C. and water at a ratio of 0.3:3.1:96.6 that had been prepared at 60° C. and then cooled down were added and mixed in. 53.74 g of water were then added followed by 0.12 g of Piror P-840. The aqueous antifoam composition so obtained had a viscosity of 200 cSt and a foam control of 29 mm.

Example 13

To 1.13 g of a blend of a silicone modified with polyethylene oxide groups having a molecular weight of 7800 Daltons and an estimated HLB of 10, a poly (alkylatedvinylpyrrolidone) having an average molecular weight of 7300 Daltons and a relative viscosity of 1.009 as a 0.1% solution in toluene and a silicone modified with polyalkylene oxide groups having a molecular weight of 12500 Daltons and an estimated HLB of 12 used in a ratio of 85:9.7:5.3 prepared at ambient was added a blend of 20.08 g of the antifoam compound example 4 and 8.04 g of a tetra-functional block copolymer derived from the sequential addition of propylene oxide and ethylene oxide to ethylenediamine having an average molecular weight of 3600 Daltons and mixed initially at ambient and then at 50° C. To this blend were added at 50° C. 53.85 g of a blend of cetyl-stearyl alcohol ethoxylates of high (16.2) and low HLB (6) blended at a ratio so that the overall HLB of the system was 9.3, propylene glycol and water blended at a ratio of 10:15:75 prepared in advance at 60° C. This mixture was then cooled down and 64.47 g of a blend of a copolymer of methyl vinyl ether and maleic anhydride crosslinked with 1,9-decadiene having an average particle size of less than 75μ, a microcrystalline cellulose polymer whose 2.6% aqueous solution has an initial viscosity of about 100 cSt at 25° C. and water at a ratio of 0.3:2.5:97.5 that had been prepared at 60° C. and then cooled down were added and mixed in. 53.89 g of water were then added followed by 0.12 g of Piror P-840. The aqueous antifoam composition so obtained had a viscosity of 970 cSt and a foam control of 28 mm.

Example 14

To 1.13 g of a blend of a silicone modified with polyethylene oxide groups having a molecular weight of 7800 Daltons and an estimated HLB of 10, a poly (alkylatedvinylpyrrolidone) having an average molecular weight of 7300 Daltons and a relative viscosity of 1.009 as a 0.1% solution in toluene and a silicone modified with polyalkylene oxide groups having a molecular weight of 12500 Daltons and an estimated HLB of 12 used in a ratio of 85:9.7:5.3 prepared at ambient was added a blend of 20.09 g of the antifoam compound of example 4 and 8.06 g of a tetra-functional block copolymer derived from the sequential addition of propylene oxide and ethylene oxide to ethylenediamine having an average molecular weight of 3600 Daltons and mixed initially at ambient and then at 50° C. To this blend were added at 50° C. 53.49 g of a blend of cetyl-stearyl alcohol ethoxylates of high (16.2) and low HLB (6) blended at a ratio so that the overall HLB of the system was 9.3, propylene glycol and water blended at a ratio of 10:15:75 prepared in advance at 60° C. This mixture was then cooled down and 63.82 g of a blend of a copolymer of methyl vinyl ether and maleic anhydride crosslinked with 1,9-decadiene having an average particle size of less than 75μ, a cellulose polymer modified with ethylene oxide groups and whose 5% aqueous solution has a viscosity of about 120 cSt at 25° C. and water at a ratio of 0.3:1.6:98.1 that had been prepared at 60° C. and then cooled down were added and mixed in. 54.13 g of water were then added followed by 0.11 g of Piror P-840. The aqueous antifoam composition so obtained had a viscosity of 280 cSt and a foam control of 30 mm.

Example 15

To 1.14 g of a blend of a silicone modified with polyethylene oxide groups having a molecular weight of 7800 Daltons and an estimated HLB of 10, a poly (alkylatedvinylpyrrolidone) having an average molecular weight of 7300 Daltons and a relative viscosity of 1.009 as a 0.1% solution in toluene and a silicone modified with polyalkylene oxide groups having a molecular weight of 12500 Daltons and an estimated HLB of 12 used in a ratio of 85:9.7:5.3 prepared at ambient was added a blend of 20.13 g of the antifoam compound of example 4 and 8.04 g of a tetra-functional block copolymer derived from the sequential addition of propylene oxide and ethylene oxide to ethylenediamine having an average molecular weight of 3600 Daltons and mixed initially at ambient and then at 50° C. To this blend were added at 50° C. 53.94 g of a blend of cetyl-stearyl alcohol ethoxylates of high (16.2) and low HLB (6) blended at a ratio so that the overall HLB of the system was 9.3, propylene glycol and water blended at a ratio of 10:15:75 prepared in advance at 60° C. This mixture was then cooled down and 64.3 g of a blend of a sodium salt of a carboxymethylcellulose having a sodium content of between 7 and 8.9%, a crosslinked acrylic acid polymer whose 0.2% aqueous mucilage has a viscosity of 3000 cP at 20° C., and water at a ratio of 2.3:0.3:97.4 that had been prepared at 60° C. and then cooled down were added and mixed in. 52.54 g of water were then added followed by 0.11 g of triethanolamine and 0.13 g of Piror P-840. The aqueous antifoam composition so obtained had a viscosity of 840 cSt and a foam control of 35 mm.

What is claimed is:

1. An antifoam emulsion comprising:
   (A) polydiorganosiloxane;
   (B) fine solid particles of inorganic oxide, bearing on the surface thereof a polydiorganosiloxane component; wherein the total amount of polydiorganosiloxane present in components (A) and (B) comprises 5 wt % to 60 wt % of the emulsion and the weight ratio of the total amount of polydiorganosiloxane present in components (A) and (B) to the amount of said inorganic oxide is 10:1 to 200:1;
   (C) an organic surfactant dispersing agent selected from the group consisting of non-ionic tetrafunctional block copolymers terminating in primary or secondary hydroxyl groups which copolymers are alkylene oxide derivatives of a diamine, at 0.1 wt % to 36 wt % of said emulsion;
   (D) a copolymer of polydimethylsiloxane with polyalkylene oxide, the molecular weight of the polydimethylsiloxane portion being 300 to 100,000 Daltons and the total molecular weight of all polyalkylene oxide present being 100 to 40,000 Daltons, at 0.1 wt. % to 20 wt. % of said emulsion;

(E) a non-ionic surfactant component comprising one or more non-ionic surfactants not conforming to agent (C) nor to copolymer (D) at 1 wt % to 60 wt % of said emulsion;

(F) a polycarboxylate or polysaccharide thickener component at 0.01 wt % to 15 wt % of said emulsion;

(G) a protective colloid component selected from the group consisting of polyvinylpyrrolidone, copolymers of polyvinylpyrrolidone and polyalkylatedvinylpyrrolidone, copolymers of polyvinylpyrrolidone with vinyl esters, and copolymers of polyvinylpyrrolidone with vinyl acetate and mixtures thereof at 0.01 wt. % to 10 wt. % of said emulsion; and (H) water comprising up to 95 wt. % of the emulsion.

2. An antifoam emulsion according to claim 1 wherein the protective colloid has the structure

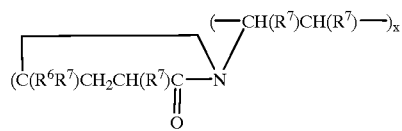

wherein each $R^6$ and $R^7$ is in each occurrence hydrogen or a $C_1$ to $C_6$ alkyl group.

3. An antifoam emulsion according to claim 1 wherein the protective colloid has a molecular weight of between 2500 Daltons and 3,000,000 Daltons.

4. An antifoam emulsion according to claim 1 wherein the protective colloid has been modified with alkyl groups containing up to 26 carbon atoms.

5. An antifoam emulsion according to claim 1 wherein said polydiorganosiloxane comprises polydimethylsiloxane having a viscosity at 25° C. of 50 to 20,000,000 cSt and component (B) comprises finely divided hydrophobic silica having an average particle size of from 1 to 20 micrometers and a BET surface area of at least 40 $m^2/g$.

6. An antifoam emulsion according to claim 1 wherein the organic surfactant dispersing agent is a non-ionic tetrafunctional block copolymer terminating in primary or secondary hydroxyl groups and having a molecular weight of 1600 to 30,000 Daltons and a 1% aqueous cloud point of 15–100° C.

7. An antifoam emulsion according to claim 6 wherein said organic surfactant dispersing agent has a molecular weight of 2000 to 8000 Daltons.

8. An antifoam emulsion according to claim 6 wherein said organic surfactant dispersing agent has an aqueous cloud point of maximum 35° C.

9. A method of making an antifoam emulsion of claim 1 comprising:

(a) preparing Blend (1), said Blend comprising polydiorganosiloxane (A), inorganic oxide (B), non-ionic dispersing agent (C), and protective polyvinylpyrrolidone based colloid derived from polyvinylpyrrolidone, copolymers of polyvinylpyrrolidone and polyalkylatedvinylpyrrolidone, copolymers of polyvinylpyrrolidone with vinyl esters, or copolymers of polyvinylpyrrolidone with vinyl acetate;

(b) preparing Blend (2), said Blend comprising Blend (1), non-ionic surfactant (E), and water; and (c) preparing Blend (3), said Blend comprising water, Blend (2), thickener (F), and a protective colloid.

* * * * *